Oct. 8, 1957 F. A. STANDIFORD 2,809,058
STUFFING BOX GLAND STRUCTURE
Filed Nov. 19, 1954 2 Sheets-Sheet 1
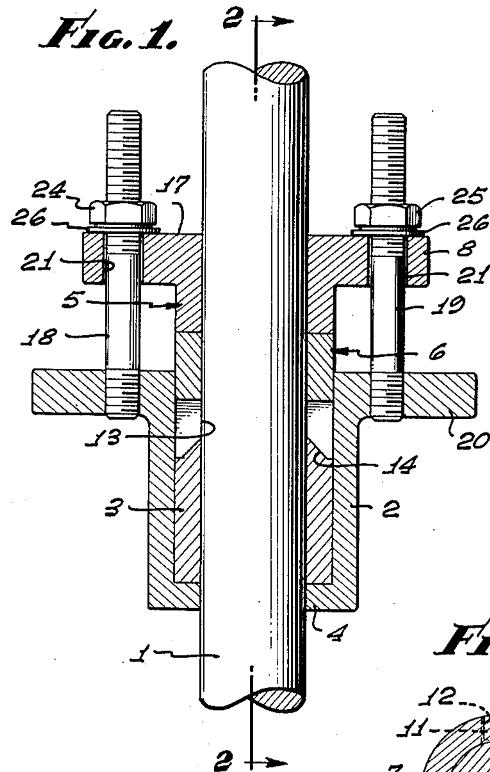
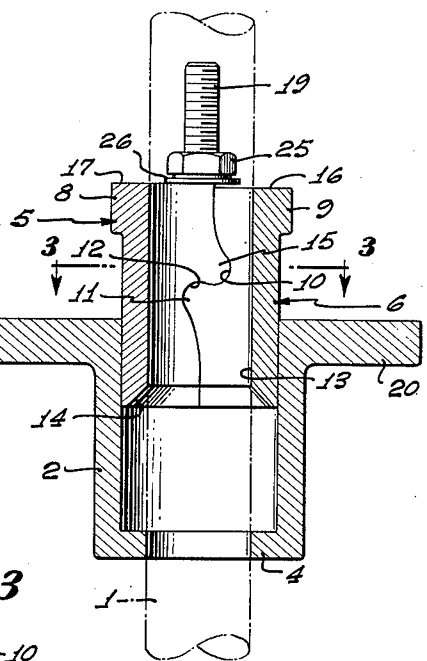
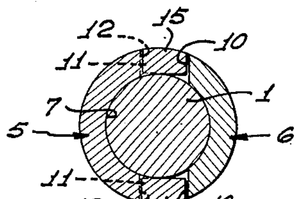
FIG. 4.
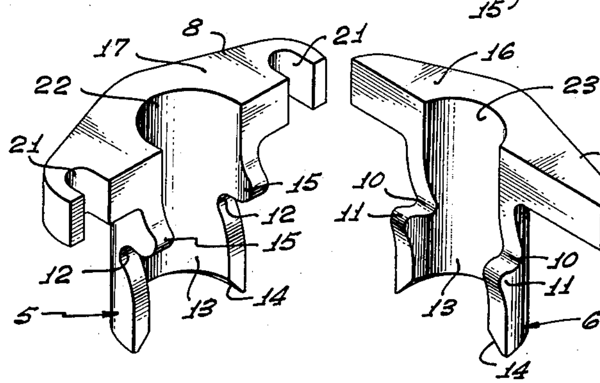
INVENTOR.
FRED A. STANDIFORD
BY
Flam and Flam
ATTORNEY.

Oct. 8, 1957 F. A. STANDIFORD 2,809,058
STUFFING BOX GLAND STRUCTURE
Filed Nov. 19, 1954 2 Sheets-Sheet 2
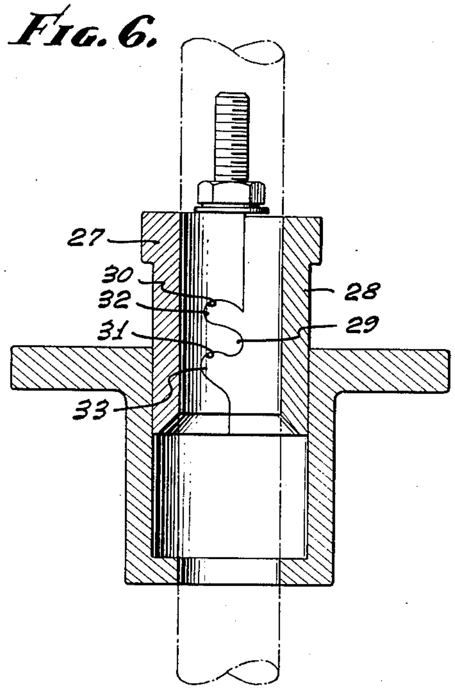
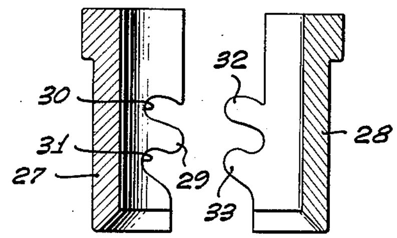
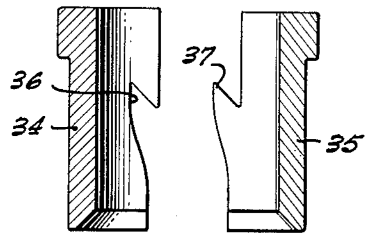
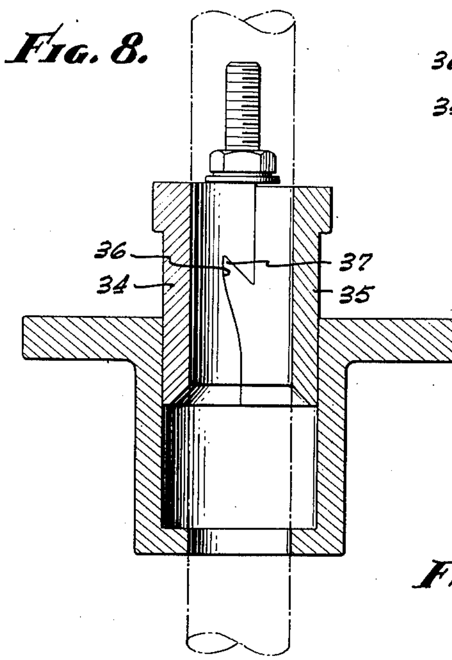
INVENTOR.
FRED A. STANDIFORD
BY
Flam and Flam
ATTORNEY.

United States Patent Office 2,809,058

Patented Oct. 8, 1957

2,809,058

STUFFING BOX GLAND STRUCTURE

Fred A. Standiford, San Pedro, Calif., assignor of one-half to Emerson Yale Jewers, San Pedro, Calif.

Application November 19, 1954, Serial No. 469,889

2 Claims. (Cl. 286—33)

This invention relates to stuffing boxes. Such structures include a gland, urged as by bolts or screws, against the packing to urge the packing in sealing relationship around a shaft or the like.

The problem of replacing the packing when necessary has often been considered; and in order to expedite this, it has been suggested to split the gland longitudinally. With such an arrangement, the packinng may not be evenly compressed.

It is one of the objects of this invention to provide a packing gland structure in which the gland is split, for facilitating removal, and in which there are provisions for effectively and uniformly compressing the packing.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be taken in a limiting sense, since the scope of the invention is best defined by the appended claims.

Referring to the drawings:

Figure 1 is a longitudinal cross sectional view of a gland structure incorporating the invention;

Fig. 2 is a longitudinal sectional view, taken along a plane corresponding to line 2—2 of Fig. 1;

Fig. 3 is a cross-sectional view, taken along a line corresponding to line 3—3 of Figure 2;

Fig. 4 is a plan view of the gland structure, with the attaching bolts and an associated shaft, in section;

Fig. 5 is a pictorial view of the two mating parts of the gland;

Fig. 6 is a view similar to Fig. 2, of a modified form of the invention;

Fig. 7 is a longitudinal sectional view of the two parts of the gland illustrated in Fig. 6;

Fig. 8 is a longitudinal sectional view similar to Fig. 2 of a further modified form of the invention; and Fig. 9 is a longitudinal sectional view of the two-part gland utilized in connection with the form of the invention shown in Fig. 8.

In the form of the invention shown in Figs. 1 to 5 inclusive, the stuffing box is shown cooperating with a rotary shaft 1. Surrounding this shaft is a stuffing box 2 for the accommodation of the packing 3 around the shaft 1. The box 2 and the packing 3 may be of any desired conventional form. The stuffing box 2 has a lower flange 4 which serves as a surface against which packing 3 may be urged.

Above the packing 3, and in order to urge it against the shaft 1, use is made of a gland structure that is split longitudinally. This gland structure is formed by a pair of members 5 and 6 which together define an interior cylindrical surface 7 (Fig. 3). The shaft 1 passes through this surface 7.

The members 5 and 6 are split generally along the longitudinal plane offset from the axis of the shaft 1, and parallel to that plane (Fig. 4). The members 5 and 6 have integral flange members 8 and 9.

The line of cleavage between these two members 5 and 6 (Fig. 2) forms a pair of projections 15 on member 5, entering with mating recesses 10 of member 6. Similarly, the projection 11 of member 6 interengages a recess 12 in member 5. The lower edge of the structure 5 and 6 has an aperture 13 for permitting the shaft 1 to pass through. This aperture has a conical surface 14 diverging downwardly in order to accommodate the upper surface of the packing 3.

By urging the member 5 downwardly in an appropriate manner, the projections 15 correspondingly urge the member 6 downwardly into operative position. In order that there be such a downward force by means of the projections 15 upon the member 6, the upper surface 16 of flange 9 is slightly above the upper surface 17 of flange 8 (Fig. 2).

In order to urge the gland 5—6 downwardly, use is made in this instance of studs 18 and 19. These studs are threaded into the flange 20 of the stuffing box 2 and project downwardly through slots 21, disposed in the mating surface of flange member 8. The flange member 9 does not have any slots, since the plane of cleavage (Fig. 4) between the flange members 8 and 9 does not intersect any part of the studs 18 and 19. These slots 21 have straight edges.

Furthermore, the gland member 5 has a cylindrical recess 22 for the reception of shaft 1. This recess is deeper than the recess 23 in gland member 6 (Fig. 4). The bottom of the recess 22 is cylindrical up to the plane passing through the axis of the shaft 1. Thereafter, as shown most clearly in Figs. 3 and 4, this recess is provided with parallel sides in order to make it possible to separate these gland members 5 and 6 from the shaft 1 by appropriate lateral movement.

The studs 18 and 19 are provided with nuts 24 and 25 engaging the upper surface 17 of flange member 8. Washers 26 may be disposed beneath these nuts.

The gland structure may be readily installed around the shaft 1 without removing the shaft.

Furthermore, the gland members 5 and 6 can be readily separated, once the nuts 24 and 25 are loosened, in order to remove and replace the gland for the purpose of renewing the packing 3.

In the form shown in Figs. 6 and 7, the general construction is the same as that just described. However, the gland members 27 and 28 are each provided with a plurality of cooperating projections and recesses. Thus the gland member 27 carries projections 29 and is provided with a pair of recesses 30 and 31 at each edge, and respectively above and below the projections 29. The gland member 28 similarly carries the projections 32, mating within recesses 30. It also carries another projection 33 mating within the recess 31.

In the form shown in Figs. 8 and 9, the gland members 34 and 35 are similarly arranged. In this form, however, only one recess 36 is provided in each edge of the gland member 34, and corresponding projections 37 of gland member 35 interfit the recesses in the respective edges of member 34.

The inventor claims:

1. In a packing gland seal structure: a pair of members having mating surfaces together defining a tubular gland and a flange for the gland; said mating surfaces extending generally longitudinally of the structure; the flange portion of one of the members having longitudinally extending slots deep enough to accommodate entirely, appropriate fastening means; the end surface of the flange portion of said one member providing bearings for said fastening means about the ends of said slots; the mating surfaces of the gland portions of said members having interfitting projection means for transmission of a longitudinal force from said one member to said other member; the end surface of the flange portion of said one member being above the end surface of the flange portion of the said other member and the operative ends of the members being longitudinally aligned when said members are in force transmitting engagement.

2. In a packing gland seal structure: a pair of members having mating surfaces together defining a tubular gland and a flange for the gland; said mating surfaces extending generally longitudinally of the structure; the flange portion of one of the members having longitudinally extending slots deep enough to accommodate entirely, appropriate fastening means; the end surface of the flange portion of said one member providing bearings for said fastening means about the ends of said slots; the mating surfaces of the gland portions of said members having a plurality of interfitting projections inclined to the axis of the members for transmission of a longitudinal force from said one member to said other member; the end surface of the flange portion of said one member being above the end surface of the flange portion of the said other member and the operative ends of the members being longitudinally aligned when said members are in force transmitting engagement.

References Cited in the file of this patent

UNITED STATES PATENTS

| | | |
|---|---|---|
| 1,020,780 | Taylor | Mar. 19, 1912 |
| 1,230,742 | McMurtrie | June 19, 1917 |
| 1,740,997 | McGuire | Dec. 24, 1929 |